Figure 1:
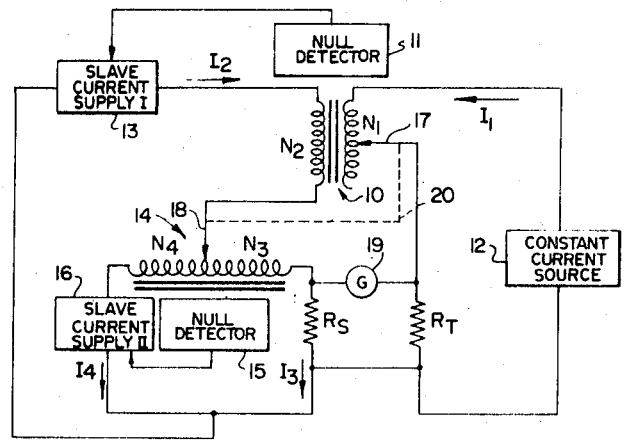

United States Patent [19]

Dauphinee

[11] 3,742,764
[45] July 3, 1973

[54] DIRECT READING RESISTANCE THERMOMETER

[75] Inventor: Thomas M. Dauphinee, Ottawa, Ontario, Canada

[73] Assignee: Canadian Patents and Development Limited, Ottawa, Ontario, Canada

[22] Filed: Feb. 24, 1972

[21] Appl. No.: 229,092

[52] U.S. Cl.......... 73/362 AR, 323/75 H, 323/75 L, 324/117
[51] Int. Cl. ............................................. G01k 7/20
[58] Field of Search .......................... 73/362 AR; 324/117 R; 323/75 H, 75 L, 75 S

[56] References Cited
UNITED STATES PATENTS

| | | | |
|---|---|---|---|
| 3,548,295 | 12/1970 | Borer | 323/75 L X |
| 3,087,337 | 4/1963 | Dauphinee et al. | 73/362 AR |
| 3,163,042 | 12/1964 | O'Sullivan | 73/362 AR |
| 3,230,772 | 1/1966 | Leslie et al. | 73/362 AR |
| 3,299,709 | 1/1967 | O'Sullivan | 73/362 AR |
| 3,339,414 | 9/1967 | Coor | 73/362 AR |
| 3,490,038 | 1/1970 | Kusters et al. | 324/117 R X |
| 3,500,171 | 3/1970 | Kusters et al. | 324/117 R X |

Primary Examiner—Richard C. Queisser
Assistant Examiner—Frederick Shoon
Attorney—James R. Hughes

[57] ABSTRACT

A direct reading resistance thermometer in the form of an electrical bridge having a first current comparator for bridge balance and a second current comparator in an arm of the bridge and having its adjustable tap ganged to that of the first. The current comparators are of the type having windings on a magnetic core and null detector and current control means for providing ampere-turn balance. By proper interconnection the output of the bridge is a quadratic function which is required to give the necessary direct reading.

3 Claims, 2 Drawing Figures

PATENTED JUL 3 1973  3,742,764

DIRECT READING RESISTANCE THERMOMETER

This invention relates to a direct reading resistance thermometer and more particularly to a resistance measuring circuit that will measure resistance in quadratic form following the standard temperature of resistance relationship for platinum resistance thermometers.

In U.S. Pat. No. 3,087,337 entitled DIRECT READING RESISTANCE THERMOMETER issued Apr. 30, 1963 to T. M. Dauphinee and H. Preston-Thomas, a circuit is described in which the temperature is obtained directly from a resistance thermometer element. The quadratic equation commonly used to represent the temperature/resistance relationship of a platinum resistance thermometer is:

$$R_T = R_0(1 + AT + BT^2) \quad (1)$$

where
  $R_0$ is the resistance of the thermometer at 0° C,
  $R_T$ is the resistance of the thermometer at the particular temperature $T$, and
  $A$ and $B$ are the two parameters of the quadratic equation of the thermometer, with $A$ being always negative. The parameters $R_0$, $A$, and $B$ vary from thermometer to thermometer. $R_0$ may vary from 0.1 ohms to more than 100 ohms but for most good quality thermometers is approximately 25.5 ohms to give a sensitivity of close to 0.1 ohms/° C. The constants $A$ and $B$ are close to $3.98 \times 10^{-3}$ and $-0.586 \times 10^{-6}$ respectively for all good platinum thermometers. The patent noted discloses a circuit in the form of a loop of resistance elements including the thermometer resistance for giving an output reading directly in temperature terms. Although the circuits described operate quite satisfactorily they do suffer from the fact that the resistance elements must be precisely calibrated and do drift in value due to thermal effects.

In U.S. Pat. 3,490,038 entitled RESISTANCE MEASURING APPARATUS HAVING A MAGNETIC MODULATOR FOR COMPARING THE RESISTANCE RATIO OF TWO RESISTORS issued Jan. 30, 1970 to N. L. Kusters and M. P. MacMartin, a circuit is described for measuring resistance values using a current comparator. Because the device involves windings on a transformer, very precise resistance measurements can be made. The circuits shown in this patent, however, read resistance directly.

The present invention provides an apparatus for indicating directly the temperature of the medium surrounding a resistance thermometer element having a temperature to resistance relationship of the form of equation (1). The circuit involves the use of current comparator apparatus which gives readings in terms of the ratio of the numbers of windings on a magnetic core.

Figure 2:
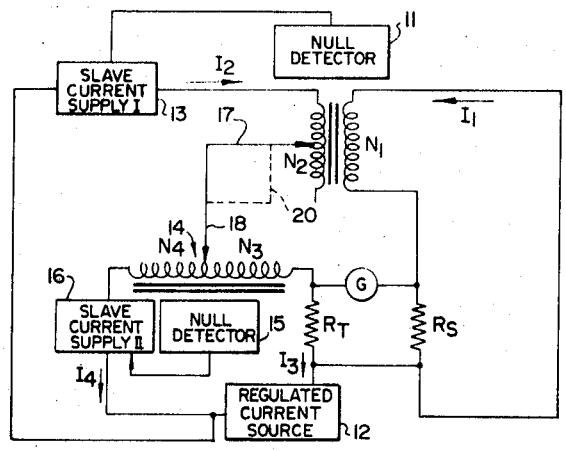

In drawings which illustrate embodiments of the invention,

FIG. 1 is a first possible arrangement of the circuitry to provide the required output function, and FIG. 2 is a second possible arrangement of the circuitry to provide the required output function.

Referring to FIG. 1, a current comparator shown generally as 10 has adjustable primary windings $N_1$ connected to a constant current source 12 which provides a current $I_1$ through windings $N_1$ and thermometer resistance $R_T$ to be measured. A null detector 11 determines ampere-turn balance between primary $N_1$ and secondary $N_2$ and provides a control signal to slave current supply 13 which generates a current $I_2$ of such magnitude and sense as to provide ampere-turn balance at the comparator. The null detector used may comprise modulation-detection windings on the core of comparator 10 similar to that shown in U.S. Pat. No. 3,490,038 or other types may be used for example, Hall effect devices. Current $I_2$ flows through secondary windings $N_2$ to second current comparator shown generally as 14 where it splits into current $I_3$ which passes through windings $N_3$ and standard reference resistor $R_s$, and current $I_4$ which passes through windings $N_4$ and slave current supply (II) 16. A null detector 15 detects ampere-turn balance between windings $N_3$ and $N_4$ of comparator 14 and provides a control signal to slave current supply 16 which provides a current of the necessary magnitude and sense to maintain balance. The adjustable taps 17 and 18 on comparators 10 and 14 are ganged (as shown by dotted line 20) such that when turns are added to $N_1$, a directly related number of turns are added to $N_3$ and thus subtracted from $N_4$. A galvanometer 19 detects final balance of the overall bridge circuit.

The overall operation of the circuit is analysed as follows with it being shown that the measuring function follows a quadratic relationship.

From the comparator ampere-turn balances:

$$I_2 N_2 = I_1 N_1 \text{ or } I_2 = I_1 N_1/N_2 \quad (2)$$

and $$I_3 N_3 = I_4 N_4 \quad (3)$$

From the galvanometer balance:

$$I_3 R_s = I_1 R_T \text{ or } I_3 = I_1 R_t/r_s \quad (4)$$

$$I_3 + I_4 = I_2 \quad (5)$$

$$N_3 + N_4 = \text{constant} = N_{34} \quad (6)$$

from (3) and (5)

$$I_3 N_3 = (I_2 - I_3) N_4 \quad (7)$$

and (4) and (7)

$$(I_1 R_t/r_s) N_3 = I_1 N_1/N_2 - (I_1 R_T/R_{Rs}) N_4$$

$$(R_T/R_s) N_3 + (R_T/R_s) N_4 = (N_1/N_2) N_4$$

from (5)

$$(R_T/R_s) N_{34} = (N_1/N_2) N_4$$

$$R_T/R_s \quad N_1 N_4/N_1 N_{34}$$

if $$N_1 = a + bt \text{ and } N_4 = c - dt$$

where $a$ and $c$ are base constants and $bt$ and $dt$ represent the changes in turns on the comparators with $b$ and $d$ being positive constants, then $$R_T/R_s = (a + bt)(c - dt)/N_2N_{34} = ac + bct - adt - bdt^2$$
$$= ac/N_2N_{34} [1 + (b/a - d/c) t - bd/ac \; t^2] \; R_t = R_s$$
$$ac/N_2N_{34} [1 + (b/a - d/c) t - bd/ac \; t^2] \quad (8)$$

putting $R_s \; ac/N_2N_{34} = \text{constant} = R_0$
and $b/z - d/c = \text{constant} = A$
and $bd/ac = \text{constant} = -B$ ($B$ being a negative quantity) then the equation becomes $$R_T = R_0(1 + At + Bt^2)$$

which is the necessary quadratic form to measure temperature directly with the circuitry described above.

Adjustment of $R_0$ may be achieved by adjustment of turns $N_2$ or $N_{34}$ and adjustment of $A$ and $B$ may be achieved by choice of $a$ and $c$. It is not convenient to change $b$ or $d$. In addition it may be noted that the same result will be obtained if $N_4 = a + bt$ and $N_1 = c - dt$ but now the positions are reversed with the primary section being $c + dt$ and the secondary $a - bt$. The circuit is in effect a quadratic function generator and various changes may be made for solving different forms of equation. The circuit described here is specific to the form of equation required to give a linear output to resistance thermometer measurements.

FIG. 2 shows a similar circuit to that of FIG. 1 but where $R_T$ and $R_s$ are reversed in position but with other elements being similarily indicated. In this case $$R_T/R_s = N_2N_{34}/N_1 \; N_4$$

and if $N_2 = A + bt$ and $N_{34} - c - dt$
then $$R_T/R_s = ac/N_1N_4 [1 + (b/a - c/d) t - bd/ac \; t^2]$$

which is the same as equation (8) above and, therefore, the same result is achieved.

Calibration of the circuit will, of course, be necessary but this presents no great difficulties. The circuits described here do not take care of an effect that is inherent in platinum resistance thermometers and which is known as the Moser wobble. This effect is inherent in all thermometers as a result of the definition of the International Temperature Scale (1968) and has the same prescribed value for all thermometers. It is less than 0.04° C over most of the working range and therefore may be disregarded for most purposes.

What is claimed:

1. Electrical bridge apparatus for obtaining a direct reading of temperature from a resistance thermometer element having a quadratic temperature-resistance characteristic comprising:
   a. a first bridge arm containing the said resistance thermometer element,
   b. a second bridge arm containing a standard resistance,
   c. adjacent third and fourth arms formed of the primary and secondary windings of a first current comparator of the type having windings on a magnetic core and null detector and current control means for providing ampere-turn balance, one of said windings having a first adjustable tap for varying the turns ratio between primary and secondary,
   d. a second current comparator formed of a winding on a magnetic core and null detector and current control means for providing ampere-turn balance, said winding being connected across one of said bridge resistances to form a closed loop,
   e. a second adjustable tap connected to said winding and to the secondary winding of the first conparator for varying the turns ratio between a first portion of the windings and a second portion of the windings,
   f. a current source connected across said bridge for energization of said bridge,
   g. a voltage measuring means connected across said bridge for determining bridge balance,
   h. said first and second taps ganged together and operable such that the bridge gives a reading as determined by the turns-ratios of the comparators in terms of a quadratic function of the thermometer resistance.

2. Apparatus for obtaining direct temperature reading from a resistance thermometer element having a relationship of temperature to resistance which may be defined by the equation $R_T = R_0(1 + AT + BT^2)$ where
   $R_T$ is the resistance of the resistance thermometer element at temperature T,
   $R_0$ is the resistance of the resistance thermometer at 0° C., and $A$ and $B$ are the two parameters of the quadratic equation expressing the temperature-resistance relationship of the resistance thermometer element, comprising:
   a. a first current comparator having primary and secondary windings on a core, said primary having an adjustable tap and connected to a constant current source and the said resistance thermometer element in series and said secondary connected to a first variable current source, and null detector means for detecting ampere-turn balance at the comparator and providing a control signal to the variable current source su,h that the latter provides the necessary secondary current to maintain balance,
   b. a second current comparator having a winding on a core, said winding having an adjustable tap and connected at the tapping point to the secondary of the first comparator such that the secondary current flows into the comparator dividing into a first channel containing a first portion of the winding and a reference standard resistance and a second channel containing a second portion of the winding and a second variable current source and a null detector for detecting ampere-turn balance at the second comparator and providing a control signal to the second variable current source such that the latter provides the necessary current to maintain balance of the second comparator,
   c. voltage comparing means connected to the said thermometer resistance element and the said reference standard resistance for determining equal voltage drops across said resistances, and
   d. ganging means connected between the adjustable tap of the first comparator and the adjustable tap of the second comparator such that the resistance of the thermometer element will be measured directly in terms of temperature according to the given quadratic equation.

3. Apparatus for obtaining direct temperature reading from a resistance thermometer element having a relationship of temperature to resistance which may be defined by the equation $$R_T = R_0 (1 + AT + BT^2) \text{ where}$$

$R_T$ is the resistance of the resistance thermometer element at temperature $T$,
$R_0$ is the resistance of the resistance thermometer at 0° C., and
$A$ and $B$ are the two parameters of the quadratic equation expressing the temperature-resistance relationship of the resistance thermometer element, comprising:

a. a first current comparator having primary and secondary windings on a core, said primary connected to a standard resistance and said secondary having an adjustable tap and connected to a first variable current source, and null detector means for detecting ampere-turn balance at the comparator and providing a control signal to the variable current source such that the latter provides the necessary secondary current to maintain balance, b. a second current comparator having a winding on a core, said winding having an adjustable tap and connected at the tapping point to the secondary of the first comparator such that the secondary current flows into the comparator dividing into a first channel containing a first portion of the winding and the said resistance thermometer element and a second channel containing a second portion of the winding and a second variable current source and a null detector for detecting ampere-turn balance at the second comparator and providing a control signal to the second variable current source such that the latter provides the necessary current to maintain balance of the second comparator, c. a regulated current source connected in the primary or secondary circuits of the first current comparator to energize the said apparatus, d. voltage comparing means connected to the said thermometer resistance element and the said reference standard resistance for determining equal voltage drops across said resistances, and e. ganging means connected between the adjustable tap of the first comparator and the adjustable tap of the second comparator such that the resistance of the thermometer element will be measured directly in terms of temperature according to the given quadratic equation.

* * * * *